United States Patent [19]

Himes

[11] 4,377,655
[45] Mar. 22, 1983

[54] DULL, SMOOTH UNIT SOLES

[75] Inventor: Glenn R. Himes, Houston, Tex.

[73] Assignee: Shell Oil Company, Houston, Tex.

[21] Appl. No.: 330,736

[22] Filed: Dec. 14, 1981

[51] Int. Cl.$^3$ ............................ C08K 3/22; C08K 5/01; C08K 5/10
[52] U.S. Cl. .................................. 524/313; 36/25 R; 524/437; 524/441; 524/505
[58] Field of Search ............... 524/313, 441, 505, 437; 36/25 R

[56] References Cited

U.S. PATENT DOCUMENTS

| | | | |
|---|---|---|---|
| Re. 28,236 | 11/1974 | Hendricks et al. | 36/25 R |
| 4,111,896 | 9/1978 | Gergen et al. | 524/505 |
| 4,126,600 | 11/1978 | Gergen et al. | 524/505 |
| 4,216,131 | 8/1980 | Himes et al. | 524/505 |
| 4,216,132 | 8/1980 | Zweig et al. | 524/505 |
| 4,248,759 | 2/1981 | St. Clair | 524/505 |

Primary Examiner—Ronald W. Griffin

[57] ABSTRACT

Unit soles having a smooth, dull appearance are molded from a polymeric composition comprising a mixture of linear ABA and radial $(AB)_{\overline{x}}BA$ monoalkenyl arene/-conjugated diene block copolymers, a styrene-acrylonitrile copolymer, vulcanized vegetable oil, hydrocarbon rubber extending oil and filler.

8 Claims, No Drawings

DULL, SMOOTH UNIT SOLES

BACKGROUND OF THE INVENTION

1. Field of the Invention

The invention relates to a polymeric composition having a smooth, dull appearance in molded unit soles. More particularly, the invention relates to a polymeric composition containing linear and radial monoalkenyl arene-conjugated diene block copolymers, a styrene-acrylonitrile copolymer and vulcanized vegetable oil.

2. Description of the Prior Art

The use of certain block copolymers and their compounds in a number of end-uses and especially footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. Re. 28,236. In general, these shoe component compositions usually comprise a mixture of styrene-butadiene block copolymer, extending oil, polystyrene and possibly a filler.

For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe areas of footwear, one of the major shortcomings of the block copolymer compounds such as those referred to in U.S. Pat. No. Re. 28,236 is the lack of a smooth appearance. Present block copolymer compounds lack the smooth, relatively unblemished surface which is characteristic of vulcanized rubber, injection molded poly(vinyl chloride) or leather. Especially desired is a rubberlike dull surface combined with unblemished smoothness.

One attempt to achieve a smooth look appearance is taught in U.S. Pat. No. 4,216,132. In the '132 patent, a mixture of linear and radial block copolymers and high density polyethylene are disclosed. While this polymeric composition resulted in relatively smooth appearance for unit soles, the surface was too shiny for certain shoe styles. Instead, what is required is a polymeric composition which results in unit soles having a smooth, non-splayed, dull surface.

SUMMARY OF THE INVENTION

The present invention deals with a polymeric composition which has particular utility in the injection molding of unit soles having a smooth, dull appearance. This appearance has never been achieved before with styrene-butadiene block copolymers. Specifically, the present invention is a polymeric composition comprising:

(a) 100 parts by weight of a mixture of a linear ABA block copolymer and a radial $(AB)_\chi BA$ block copolymer where $\chi$ is greater than 1, the weight ratio of linear to radial block copolymer is between about 25/75 and about 90/10, each block A being a monoalkenyl arene polymer having an average molecular weight between about 5,000 and 45,000, each block B being an elastomeric conjugated diene polymer having an average molecular weight between about 15,000 and about 300,000, and said blocks A comprise 8–75% by weight of each copolymer;

(b) about 5 to about 50 parts by weight of a styrene-acrylonitrile copolymer;

(c) about 3 to about 30 parts by weight of a vulcanized vegetable oil;

(d) about 0 to about 200 parts by weight of a hydrocarbon rubber extending oil; and (e) about 0 to about 250 parts by weight of a finely divided filler.

The ingredients responsible for the unique combination of smoothness and dullness in the above composition are styrene-acrylonitrile copolymer (SAN) and vulcanized vegetable oil. Besides imparting dullness, SAN also adds hardness and stiffness to the compound. Prior art concepts employed polystyrene, poly($\alpha$-methylstyrene), high impact polystyrene (rubber-modified polystyrene) and the like to harden and stiffen TR compounds. However, these resins imparted an undesirable shiny surface to injection molded unit soles. Polypropylenes have also been evaluated in compositions of this type. Although generally dull in appearance, such combinations usually exhibit delamination (easy separation of a surface layer) after injection molding of a unit sole. SAN offers dullness with freedom from delamination.

Vulcanized vegetable oil (e.g., vulcanized rape seed oil) imparts dullness to a TR compound without adding to hardness or stiffness. This dullness adds to the dullness imparted by SAN and is independently adjustable, since vulcanized vegetable oil does not noticeably affect bulk properties.

Prior art compounds generally relied on hydrated silica filler to impart dullness to TR compounds. This type of dullness is inferior to that given by the subject invention because the surface is relatively rough, grainy and uneven in texture. The surface generated by hydrated silica is due to steam evolved at injection molding temperatures. Other methods of surface dulling, e.g., incorporation of a blowing agent, also generate grainy, rough and uneven textures. The subject invention does not rely on evolution of a volatile component for surface dullness. The preferred filler, hydrated alumina, does not evolve steam at TR injection molding temperatures (300°–380° F.). Other non-steam generating fillers, including calcium carbonates, talcs, clays, some silicates, etc., are acceptable. However, dullness and translucency are superior when hydrated alumina is used.

DETAILED DESCRIPTION OF THE INVENTION

The block copolymer component of the present invention is a mixture of a linear ABA type block copolymer and a radial $(A—B)_\chi B—A$ block copolymer where $\chi$ is over 1. Preferably, $\chi$ varies from over 1 to 15, more preferably from about 2 to about 6. The A blocks are monoalkenyl arene polymer blocks and the B blocks are elastomeric conjugated diene polymer blocks. Typical linear block copolymers have the structure polystyrene-polybutadiene-polystyrene. A typical radial polymer would comprise one in which the diene block has three or more branches, the tip of each branch being connected to a polystyrene block. See U.S. Pat. No. 3,594,452. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The use of both a linear and a radial block copolymer results in improved properties for the mixture compared to the use of just a linear copolymer or just a radial copolymer. The radial copolymer contributes needed strength to the mixture and reduces delamination tendencies. The linear polymer promotes flex crack resistance, blending and flow. The weight ratio of linear to radial block copolymer may vary from about 25/75 to about 90/10, preferably from about 40/60 to about 80/20.

The average molecular weights of each of the blocks may be varied as desired. The monoalkenyl arene polymer blocks preferably have number average molecular weights between about 5,000 and about 45,000, more preferably between about 8,000 and about 30,000. The elastomeric conjugated diene polymer blocks preferably have number average molecular weights between about 15,000 and about 300,000, more preferably between about 25,000 and about 150,000. The average molecular weights of the polystyrene end blocks and determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 75%, preferably between about 20% and about 50% by weight. The general type and preparation of these block copolymers are described in U.S. Pat. No. Re. 28,246 and in many other U.S. and foreign patents.

The styrene-acrylonitrile (SAN) copolymers employed in this invention are well-known, commercially available polymers. See, e.g., U.S. Pat. Nos. 2,941,985 and 4,264,747, and Billmeyer, *Textbook of Polymer Chemistry*, Interscience Publishers, New York, 1957, pages 291-292. As shown in the Illustrative Embodiments which follow, the SAN copolymer is important in providing the dull appearance along with supporting hardness. The amount of SAN copolymer employed is between about 5 and about 50 phr, preferably between about 15 and about 35 phr. "Phr" refers to parts by weight per hundred parts by weight rubber, or block copolymer as in this case.

The vulcanized vegetable oils employed herein are reaction products of various oils, e.g., rape seed oil and a crosslinking agent such as sulfur monochloride. A preferred material is Factice AA, a vulcanized rape seed oil. The amount of vulcanized vegetable oil employed in this invention is between about 3 phr and about 30 phr, preferably between about 5 phr and about 20 phr.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX® oils, Nos. 310, 371 and 311 (which is a blend of 310 and 371). The amount of extending oil employed varies from about 0-200 phr, preferably from about 25-100 phr.

The fillers which may be used in the present compositions are well known in the art and include clay, talc, alumina, anhydrous silica, titanium dioxide, carbon blacks, calcium carbonate, and other pigments as well as certain dry fibrous fillers such as polyester or acrylic fibers. Preferred fillers include alumina and calcium carbonate. In a most preferred embodiment, the filler is hydrated alumina. The amount of filler employed varies from 0-250 phr, preferably 5-60 phr. Additional minor amounts of antioxidants, ultraviolet stabilizers and the like may also be added.

In a preferred embodiment, the polymeric compositions also contain between about 0.1 and about 3.0, preferably between about 0.3 and about 1.0 phr stearic acid. This stearic acid is useful in imparting additional dullness to the composition.

The components of this invention may be combined by processes known in the art including blending such as by extrusion, Banbury mixing or by dry-blending procedures. In the latter case, it is preferred that the block copolymer and other polymers be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art. Preferably, however, the various components are melt blended.

While the present specification emphasizes the use of these compositions in footwear components, other end-uses also are contemplated. These include, for example, automotive parts and wire cable coatings. Tubular products such as hoses and the like also are contemplated.

The use of the present compositions in footwear includes especially their use in soling when prepared by injection molding and slab soling, such as produced by cutting shoe sole forms from extruded slabstock. The advantages of the present compositions are most apparent in injection molding of unit soles which are later attached by adhesion or sewing to uppers. The compositions also may be used in the manufacture of injection molded canvas shoe soles wherein the soling is directly injection molded onto the canvas upper which may be canvas or various natural and synthetic fibers, including leather, vinyl and polymeric materials. In some cases pre-coating of the upper with a primer is required to effect adhesion.

The invention is further illustrated by means of the following illustrative embodiments, which are given for the purpose of illustration alone and are not meant to limit the invention to the particular reactants and amounts disclosed.

ILLUSTRATIVE EMBODIMENT I

In Illustrative Embodiment I, five different compositions were prepared, two outside the scope of the invention (H-470 and H-483) and three within the scope of the invention. The linear block copolymer was a styrene-butadiene-styrene block copolymer having a molecular weight distribution according to the invention. Both radial block copolymers were styrene-butadiene block copolymers having the structure $(SB)_xBS$ were x averages about 2.5. Radial Block Copolymer #1 has a lower S block mol weight and lower total mol weight than does Radial Block Copolymer #2. The SAN copolymer employed was Tyril 880B copolymer, which has a styrene content of about 70 weight percent. The vulcanized vegetable oil was Factice AA vulcanized rape seed oil. All examples contained a standard pigment-antioxidant-inhibitor package.

The individual components were mixed on a Banbury mixer at about 350° F. for a total mix time of about 3 minutes.

Samples of the various compositions were tested according to the following tests:

| Test | Standard Test Number |
|---|---|
| Shore A Hardness | D-2240 |
| Tinius Olsen Stiffness | D-747 |
| Taber Abrasion | D-1044 |
| Ross Cut Growth | D-1052 |

The various formulations and test results are presented below in Table 1.

TABLE I

| | Parts by Wt. | | | | |
|---|---|---|---|---|---|
| Compound No. | H-470 | H-483 | H-492 | H-493 | H-504 |
| Formulation | | | | | |
| Radial Block Copolymer #1 | 76.0 | — | 25.0 | 50.0 | 37.5 |
| Radial Block Copolymer #2 | 24.0 | — | — | — | — |
| Linear Block Copolymer | — | 100.0 | 75.0 | 50.0 | 62.5 |
| Hydrocarbon Oil | 56.8 | 60.0 | 65.0 | 60.0 | 62.5 |
| Low mol. wt. polystyrene | 24.0 | — | — | — | — |
| SAN copolymer | 25.0 | 25.0 | 25.0 | 25.0 | 25.0 |
| Vul. vegetable oil | 10.0 | 10.0 | 10.0 | 10.0 | 10.0 |
| Hydrated alumina | 10.0 | 10.0 | 10.0 | 10.0 | 10.0 |
| Zinc stearate | 0.5 | — | — | — | — |
| Stearic acid | 0.5 | 0.5 | 0.5 | 0.5 | 0.5 |
| Properties | | | | | |
| Hardness, Shore A, Injection Molded, Inst./10 sec. | 49 | 75 | 50 | 50 | 57 |
| Melt Flow, Cond. E, g/10 min. | 15.3 | 3.9 | 8.7 | 13.4 | 9.0 |
| Specific Gravity | 0.98 | 0.99 | 0.98 | 0.98 | 0.98 |
| Ross Flex Crack Resistance, kc to 500% growth | 70 | 200 | 215 | 105 | 143 |
| Taber Abrasion, cm³/kc | 0.71 | 0.84 | 0.97 | 0.88 | 0.94 |
| Adhesion, KN/m (pli) | 6.7(38) | 9.3(53) | 7.9(45) | 6.1(35) | 7.5(43) |
| Stiffness, Tinius Olsen, kPa (psi) | — | 18340 (2660) | 8340 (1210) | 5650 (820) | 6210 (900) |
| Appearance (5 to 1 scale, 5 best) | 4 | 3 | 3.5 | 4 | 5 |

To meet the requirements of this application, a flex crack resistance of at least 100 kc, melt flow of at least 5 g/10 min, stiffness of 700–1400 psi, and hardness of 50–60 Shore A are necessary. Compound H-470 fails in hardness, and flex crack resistance. Compound H-483 fails in hardness, melt flow, and stiffness. In addition, the latter compound exhibited unacceptable weld lines. The remaining compounds in this series overcome these deficiencies by combination of a radial and linear polymer in appropriate proportions. The required smooth dullness is provided in all five compounds by the presence of SAN copolymer and vulcanized vegetable oil.

What is claimed is:

1. A non-delaminating polymeric composition having a smooth, dull appearance in molded unit soles, said composition comprising:
    (a) 100 parts by weight of a mixture of a linear ABA block copolymer and a radial $(AB)_\chi BA$ block copolymer where $\chi$ is greater than 1, the weight ratio of linear to radial block copolymer is between about 25/75 and about 90/10, each block A being a monoalkenyl arene polymer having an average molecular weight between about 5,000 and 45,000, each block B being an elastomeric conjugated diene polymer having an average molecular weight between about 15,000 and about 300,000, and said blocks A comprise 8–75% by weight of each copolymer;
    (b) about 5 to about 50 parts by weight of a styrene-acrylonitrile copolymer;
    (c) about 3 to about 30 parts by weight of a vulcanized vegetable oil;
    (d) about 0 to about 200 parts by weight of a hydrocarbon rubber extending oil; and
    (e) about 0 to about 250 parts by weight of a finely divided filler.

2. The composition according to claim 1 wherein said A block is a polystyrene block and said B block is a poly-butadiene block.

3. The composition according to claim 1 wherein said radial block copolymer has the structure $(AB)_\chi BA$ where $\chi$ is between about 2 and about 6.

4. The composition according to claim 1 also containing between about 0.1 and about 3.0 parts by weight stearic acid.

5. The composition according to claim 1 wherein the amounts of each component in the composition are:
    (a) 100 parts by weight linear plus radial block copolymers;
    (b) about 15 to about 35 parts by weight styrene-acrylonitrile copolymer;
    (c) about 5 to about 20 parts by weight vulcanized vegetable oil;
    (d) about 25 to about 100 parts by weight rubber extending oil; and
    (e) about 5 to about 60 parts by weight filler.

6. The composition according to claim 1 or claim 4 wherein said vulcanized vegetable oil is vulcanized rape seed oil.

7. The composition according to claim 1 wherein said filler is hydrated alumina.

8. The unit sole molded from the composition of claim 1.

* * * * *